(12) United States Patent
Gili Martínez

(10) Patent No.: US 10,794,501 B2
(45) Date of Patent: Oct. 6, 2020

(54) MIXING CARTRIDGE

(71) Applicant: SEDAL, S. L., Sant Andreu de la Barca (ES)

(72) Inventor: Sergi Gili Martínez, Barcelona (ES)

(73) Assignee: SEDAL, S. L., Sant Andreu de la Barca (ES)

( * ) Notice: Subject to any disclaimer, the term of this patent is extended or adjusted under 35 U.S.C. 154(b) by 163 days.

(21) Appl. No.: 16/063,067

(22) PCT Filed: Dec. 14, 2016

(86) PCT No.: PCT/EP2016/081013
§ 371 (c)(1),
(2) Date: Jun. 15, 2018

(87) PCT Pub. No.: WO2017/102847
PCT Pub. Date: Jun. 22, 2017

(65) Prior Publication Data
US 2020/0149641 A1    May 14, 2020

(30) Foreign Application Priority Data
Dec. 16, 2015   (EP) ..................................... 15382631

(51) Int. Cl.
*F16K 11/078*   (2006.01)
*F16K 11/14*    (2006.01)
*F16K 47/02*    (2006.01)

(52) U.S. Cl.
CPC .......... *F16K 11/0787* (2013.01); *F16K 11/14* (2013.01); *F16K 47/026* (2013.01)

(58) Field of Classification Search
CPC ....... Y10T 137/9464; Y10T 137/86823; F16K 47/026; F16K 11/14; F16K 11/0787; E03C 1/05
(Continued)

(56) References Cited

U.S. PATENT DOCUMENTS 3,625,252 A    12/1971   Bermel et al.
3,893,482 A     7/1975   Loose
(Continued)

FOREIGN PATENT DOCUMENTS

EP    0 311 573 A1    4/1989
EP    0 878 654 A2   11/1998
(Continued)

OTHER PUBLICATIONS

International Preliminary Report on Patentability Chapter II for International Application No. PCT/EP2016/081013 dated Feb. 8, 2018.
(Continued)

*Primary Examiner* — Michael R Reid
(74) *Attorney, Agent, or Firm* — Jenkins, Wilson, Taylor & Hunt, P.A.

(57) ABSTRACT

The mixing cartridge comprises: —a cartridge body (1); —an actuation lever (5) —a fixed plate (2) placed within the cartridge body (1) and comprising inflow input openings and an output opening for the outflow of mixed water; and —a movable element comprising a movable plate (4) provided within the cartridge body, coupled to the actuation lever to be moved on or with respect to the fixed plate and internally defining a mixing chamber (41) open towards the fixed plate and which selectively communicates or blocks the communication of said input openings with the output opening. The mixing cartridge comprises a flow rate limiting arrangement placed within the cartridge body in the path followed by the water flow between said inflows and said outflow, so that the flow rate of said water is limited.

14 Claims, 5 Drawing Sheets

(58) Field of Classification Search
USPC .......................................... 137/625.41, 801
See application file for complete search history.

(56) References Cited

U.S. PATENT DOCUMENTS

| | | | |
|---|---|---|---|
| 4,908,552 A | | 3/1990 | Kumakura |
| 4,941,506 A | * | 7/1990 | Bergmann .......... F16K 11/0787 137/625.4 |

FOREIGN PATENT DOCUMENTS

| | | |
|---|---|---|
| EP | 3 181 963 A1 | 6/2017 |
| FR | 2 602 024 A1 | 1/1988 |
| FR | 2 609 773 A1 | 7/1988 |
| JP | 2010 084859 A | 4/2010 |
| WO | WO 2017/102847 A1 | 6/2017 |

OTHER PUBLICATIONS

International Search Report corresponding to International Application No. PCT/EP2016/081013 dated Feb. 14, 2017.
Written Opinion of the International Search Authority for International Application No. PCT/EP2016/081013 dated Jun. 22, 2017.
European Search Report and Opinion for EP 3 181 963 dated Jun. 3,2016.
Decision to Grant a European Patent for EP 3 390 874 dated Aug. 1, 2019.
Intention to Grant a European Patent for EP 3 390 874 dated Jun. 12, 2019.
Office Action corresponding to CN 108700210 dated May 31, 2019.
Office Action corresponding to CN 108700210 dated Mar. 13, 2020.

* cited by examiner

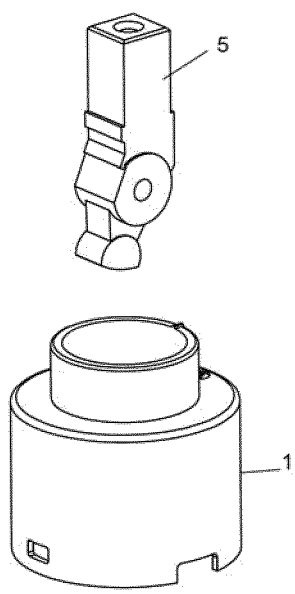
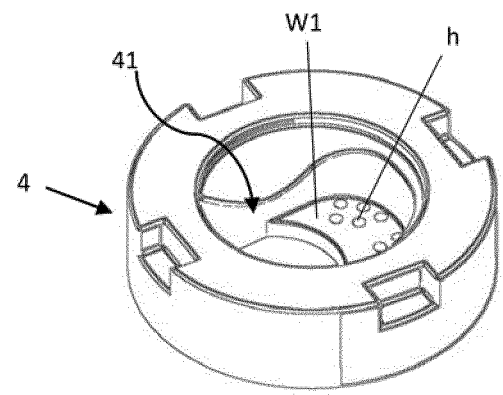
Fig. 3
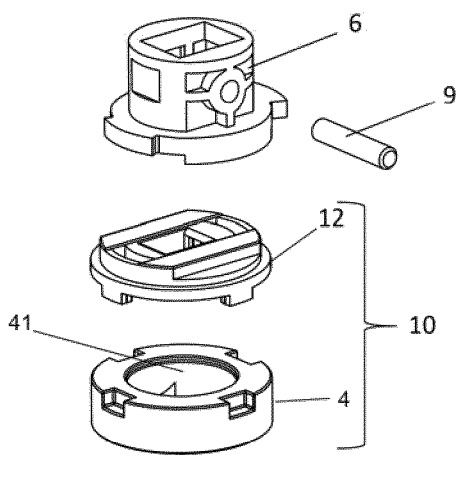
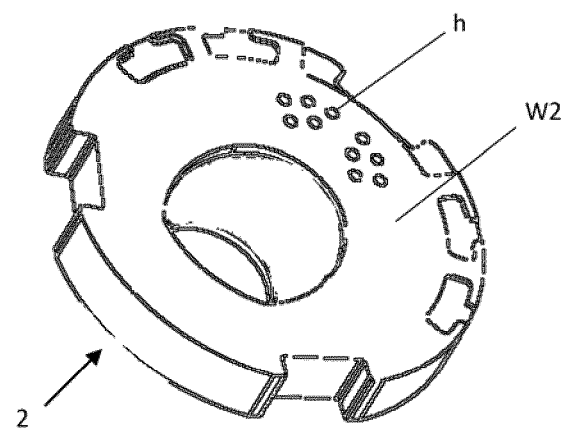
Fig. 4
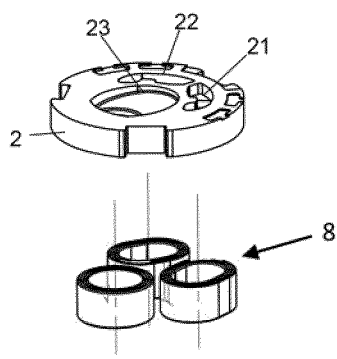
Fig. 2
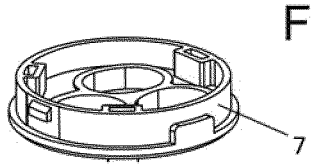

MIXING CARTRIDGE

FIELD OF THE INVENTION

The present invention relates to a mixing cartridge, particularly for a single-grip mixing faucet, intended for selectively regulating and controlling the outflow of mixed water and temperature thereof, and more particularly to a mixing cartridge comprising a flow rate limiting arrangement.

BACKGROUND OF THE INVENTION

It is known the use of mixing valves having mixing cartridges in single-grip faucets to mix separate inflows of hot and cold water and, in this manner, regulate the flow-rate and temperature of the mixed water leaving the faucet.

A typical mixing cartridge comprises:
a cartridge body;
an actuation lever;
at least one fixed plate provided at least in part within the cartridge body, the fixed plate comprising input openings for the separate inflow of hot and cold water and an output opening for the outflow of mixed water through an outlet of a faucet; and
a movable element comprising a movable plate provided within the cartridge body and coupled to the actuation lever to be moved on or with respect to the fixed plate by acting on the actuation lever, said movable plate internally defining a mixing chamber open towards said fixed plate and which selectively communicates or blocks the communication of said input openings, in part or completely, with said output opening.

A typical mixing cartridge comprises a cartridge body and a top element, rotatably coupled to the cartridge body, and that comprises a fulcrum and an actuation lever pivotable about said fulcrum between a forward and a backward position. Inside the cartridge body there are a fixed plate comprising openings for the separate inflow of hot and cold water and with an opening for the outflow of mixed water, and a movable element that can be displaced with respect to the fixed plate and that comprises a second plate which internally defines a mixing chamber.

In some cases, the movable element is coupled to the actuation lever of the top element so that, by pivoting the actuation lever about a fulcrum of a top element comprised by the mixing cartridge, the movable element can be linearly displaced on the fixed plate increasing progressively the flow-rate of mixed water. Additionally, rotating the top element about its axis causes a rotation of the movable element on the fixed plate varying progressively the mixture of hot and cold water, and hence the temperature of the mixed water, for a given outflow rate. The mixing cartridges of this first type are usually referred to as direct-movement mixing cartridges.

Alternatively, there are some other mixing cartridges in which the movable element is rotatably coupled to an end of the actuation lever and at the same time slidably coupled to a lug provided in the internal surface of the cartridge body so that, when the actuation lever is in its forward position, a rotation of the top element about its axis does not rotate the movable element on the fixed plate. That is, the movable element remains at a first position in which there is no outflow of mixed water. However, by pivoting the actuation lever about the fulcrum towards its backward position, the movable element is displaced on the fixed plate from said first position to a second position in which there is a maximum outflow of mixed water. Said second position is dependent on the relative rotation angle of the top element with respect to the cartridge body, hence defining a locus of second positions. The mixing cartridges of this second type are usually referred to as indirect-movement mixing cartridges.

For all of the above mentioned mixing cartridges, whether direct-movement mixing cartridges or indirect-movement mixing cartridges, it has been found that the passage of water from the input openings of the fixed plate to the mixing chamber of the movable plate, and from the latter to the output opening is associated to a too high water flow rate as to achieve considerable savings on water consumption.

Hence, there is a need to reduce the water flow rate in such mixing valves to achieve water-saving standards. That goal has been tried to be achieved in different manners, with results not quite significant and certainly susceptible of improvement.

Moreover, it is also known that in such mixing valves the passage of water causes a noise due to cavitation, turbulence or pressure drops in the flow of water towards the fixed plate output opening which is coincident with the faucet outlet mouth.

In order to minimize that noise, it is known to incorporate to said valves different types of solutions implemented in the mixing area of the mixing chamber of the movable plate. Said solutions are implemented in the form of parts added to said mixing area, such as metallic or plastic meshes, or protuberant elements placed, for example, at the top of the mixing chamber in order to minimize turbulence occurring within said mixing chamber.

Some of said valves including meshes are disclosed in patent documents JPS56117177U, ES2005241A6 and U.S. Pat. No. 3,893,482A. Said meshes are only intended for noise-reduction not for reducing the water flow rate. Therefore, the interstitial material between their holes is constituted only by thin wires forming the meshes which do not block the pass of water through the mesh but, in contrast, are intended to break the turbulences of the water flow passing through the holes of the meshes. No water flow rate limitation is provided by said meshes but a flow regime variation, from a turbulent regime to a laminar regime.

JP2010084859A discloses a valve with a noise-reduction assembly which is not implemented by means of a mesh but by means of a fitting member to be fit in the outflow port of the valve. Said fitting member includes some tilted through holes with the purpose of directing the water outflow in a tilted direction to collide with an internal wall of a hollow part coupled to the lower end of the valve, so that noise is reduced. Although the interstitial material between said tilted through holes is not formed by wires, said interstitial material is not either designed to block the pass of water through the fitting member, as said fitting member is only intended for noise reduction, not for flow rate limitation.

Different proposals describing some of the above mentioned valves which incorporate protuberant elements are disclosed in patent documents FR2602024A1 and EP0311573.

For the valve disclosed by FR2602024A1 said protuberant elements are constituted by some plates a portion of which is placed within the input ports of the fixed disk of the valve, orthogonally with respect to the direction of the water input flow, and which are also intended, like the meshes of the above mentioned proposals, to break the turbulences of said water input flow.

The valve disclosed by EP0311573 also includes some protuberant elements for breaking the turbulences of the water flow, but in this case said protuberant elements, which are also implemented in the form of orthogonal plates, are arranged at the top of the mixing chamber, i.e., contrary to the plates of the valve of FR2602024A1, in this case the plates are not arranged in the path followed by the water flow between the water inflows and the outflow of mixed water.

All of the above mentioned solutions achieve the effect of noise reduction and are intended to be implemented in mixing valves providing a high water flow rate, which are the ones needing for noise reduction, therefore constituting a teaching away for looking for a solution for reducing the water flow rate of the mixing valves. In fact, turbulences are responsible for limiting the water flow rate, and therefore when said turbulences are broken, the water flow regime turns into a laminar regime, the water flow rate is increased as less charge losses are produced. Therefore, the above mentioned proposals, which are explicitly disclosed as intended for noise reduction, do the opposite to a flow rate limitation, i.e. they provide a flow rate increasing.

It is, therefore, necessary to provide an alternative to the state of the art which covers the gaps found therein, particularly focused on the above mentioned water flow rate reduction goal, in order to meet water-saving requirements implying a low water flow rate in order to meet high ecological standards.

SUMMARY OF THE INVENTION

To that end, the present invention relates to a mixing cartridge, comprising, in a known manner:
- a cartridge body;
- an actuation lever;
- a fixed plate provided at least in part within the cartridge body, the fixed plate comprising input opening for the separate inflow of hot and cold water and an output opening for the outflow of mixed water; and
- a movable element comprising a movable plate provided within the cartridge body and coupled to the actuation lever to be moved on or with respect to the fixed plate by acting on the actuation lever, said movable plate internally defining a mixing chamber open towards said fixed plate and which selectively communicates or blocks the communication of said input openings, in part or completely, with said output opening.

In contrast to the known mixing cartridges, the mixing cartridge of the present invention comprises, in a characterizing manner, a flow rate limiting arrangement placed within the cartridge body in the path followed by the water flow between said inflows and said outflow, so that the flow rate of said water is limited by said flow rate limiting arrangement.

For an embodiment, the mentioned flow rate limiting arrangement comprises a permeable barrier having a permeability distribution selected and predetermined to affect at least portions of the water flow so that a required limited water flow rate is provided thereto.

For an embodiment, said permeable barrier comprises a wall having a plurality of through holes providing said permeability to the barrier.

For a variant of said embodiment, said plurality of through holes are distributed according to at least one holes distribution pattern defined in a region of the wall, said at least one holes distribution pattern being interposed in one of said inflows of hot and cold water or in said outflow of mixed water, so that the flow rate thereof is limited when passing through said holes.

When the holes of the holes distribution patterns are interposed in one or both inflows, they also act as filters for possible particles or impurities included in the water flow, so that a possible damage of the mixing cartridge, and particularly of the integrity of the sealing contact area between the fixed and the movable disks, is avoided.

Preferably, the plurality of through holes are distributed according to at least two separate holes distribution patterns defined in two corresponding separate regions of the wall, each of said holes distribution patterns interposed in one of said inflows of hot and cold water so that the flow rate thereof is limited when passing through the holes of the respective holes distribution pattern.

For an embodiment, the above mentioned wall is dimensioned and arranged to be interposed between the water inflows and the mixing chamber, so that the communication between the output opening for the outflow of mixed water and the mixed chamber is not blocked by the wall in any position of the movable plate.

For an alternative embodiment, the plurality of through holes are distributed according to at least three separate holes distribution patterns defined in three corresponding separate regions of the wall, each of said holes distribution patterns interposed in one of the hot water inflow, the cold water inflow and the mixed water outflow, so that the flow rate thereof is limited when passing through the holes of the respective holes distribution pattern.

For an embodiment, each of the separate regions of the wall circumscribe the holes of a respective of said separate holes distribution patterns and interstitial material remaining between the holes which block the pass of water flow there through, wherein for each of said separate regions the area occupied by the holes is lower than the area occupied by the interstitial material.

According to a variant of said embodiment, each of the separate regions the area occupied by the holes is between a 10% and a 40% of the total area of the separate region, and preferably between a 20% and a 30% of the total area of the separate region.

According to an embodiment of the mixing cartridge of the present invention, the separate regions of the wall circumscribing the holes of the holes distribution patterns interposed in the inflows of hot and cold water are separated from one another a predetermined distance which, together with the holes distribution in said holes distribution patterns, provides a substantially constant flow rate for the water entering into the mixing chamber for all the possible rotating positions of the movable plate about a longitudinal axis of the cartridge body while the movable plate is maintained at the same linear position on the fixed plate.

For another embodiment, the holes are distributed in the holes distribution patterns to provide a substantially progressive flow rate increasing/decreasing for the water outflow through the full stroke of the actuation lever when pivoted about a fulcrum orthogonal to a longitudinal axis of the cartridge body.

Preferably, the through holes traverse the wall substantially orthogonally with respect to a plane occupied by a face of the wall, so that the path followed by the water flow when traversing the holes is also substantially orthogonal to said face of the wall.

According to an embodiment, part or all of the flow rate limiting arrangement is placed within the mixing chamber.

When said part of the flow rate limiting arrangement which is placed within the mixing chamber is the above mentioned wall, the wall is attached to or integral with the movable plate, for some embodiments.

For another embodiment, part or all of the flow rate limiting arrangement is placed outside the mixing chamber. For a variant of said embodiment, said part of the flow rate limiting arrangement which is placed outside the mixing chamber is the above mentioned wall.

According to a further embodiment, the flow rate limiting arrangement comprises at least two walls, the above mentioned wall being a first wall, and the above mentioned part of the flow rate limiting arrangement which is placed outside the mixing chamber being a second wall also comprised by the permeable barrier and also having a plurality of through holes which follow one or more holes distribution patterns and which communicate with the through holes of the first wall for some of positions adopted by the movable plate.

By means of said further embodiment, the water flow passes through a double permeable barrier constituted by said first and second walls, to be passed successively by the water flow, which increases the flow rate reduction effect provided by the present invention.

Regarding the holes distribution patterns, number and sizes of the holes of the first and second walls, they can be equal in each wall, such that for a position of the movable plate the holes of both walls are coincident, or can be different in order to provide a different flow rate reduction effect on the water flow passing there through.

For an embodiment, the above mentioned wall or second wall is attached to or integral with the fixed plate.

For a variant of said embodiment, the input openings for the separate inflow of hot and cold water comprised by the fixed plate are constituted by the through holes of two of the respective holes distribution patterns.

For an alternative variant of said embodiment, the through holes of two of the respective holes distribution patterns are arranged over the input openings of the fixed plate, such that the holes of each of the holes distribution patterns are communicated with a respective one of said input openings.

Preferably, each of the through holes has a maximum transversal dimension of between 0.5 mm and 3 mm, preferably of substantially 1 mm.

For a preferred embodiment, the through holes have a circular cross-section, said maximum transversal dimension corresponding to the diameter of the hole.

Depending on the embodiment, all the through holes of each pattern have the same cross-section shape (circular, triangular, rectangular, etc.) and/or the same dimensions, or different cross-section shapes and/or different dimensions.

For a further embodiment, the flow rate limiting arrangement comprises a wall arranged between the movable plate and the fixed plate, said wall being the above mentioned wall or a second or a third wall, for different variants of said embodiment.

The wall or walls are arranged, for a preferred embodiment, substantially in parallel with the moveable and fixed plates, although for other embodiment, the wall or walls, or at least part thereof, are not arranged in parallel with the movable and fixed plates.

The wall or walls are preferably flat, although for some embodiment they are not flat but have an uneven or irregular shape.

The design of the different elements of the flow rate limiting arrangement of the present invention (i.e. the walls, the holes distribution pattern the size and shape of the holes, etc.) has the goal of reducing the water flow rate of the water flowing within the mixing cartridge, and can be varied according to the flow rate reduction required.

A mixing valve including the mixing cartridge of the present invention, and a faucet including such a mixing vale are also further aspects proposed by the present invention.

BRIEF DESCRIPTION OF THE FIGURES

In the following some preferred embodiments of the invention will be described with reference to the enclosed figures. They are provided only for illustration purposes without however limiting the scope of the invention.

FIG. 2 shows an exploded perspective view of the mixing cartridge of the present invention.

FIG. 3 shows a movable plate of the mixing cartridge of the present invention, for an embodiment for which the movable plate has a wall having two separate holes distribution patterns, for limiting the two respective water inflows.

FIG. 4 shows a fixed plate of the mixing cartridge of the present invention, for an embodiment for which the fixed plate has a wall having two separate holes distribution patterns, for limiting the two respective water inflows.

DESCRIPTION OF THE PREFERRED EMBODIMENTS

Figure 1A:
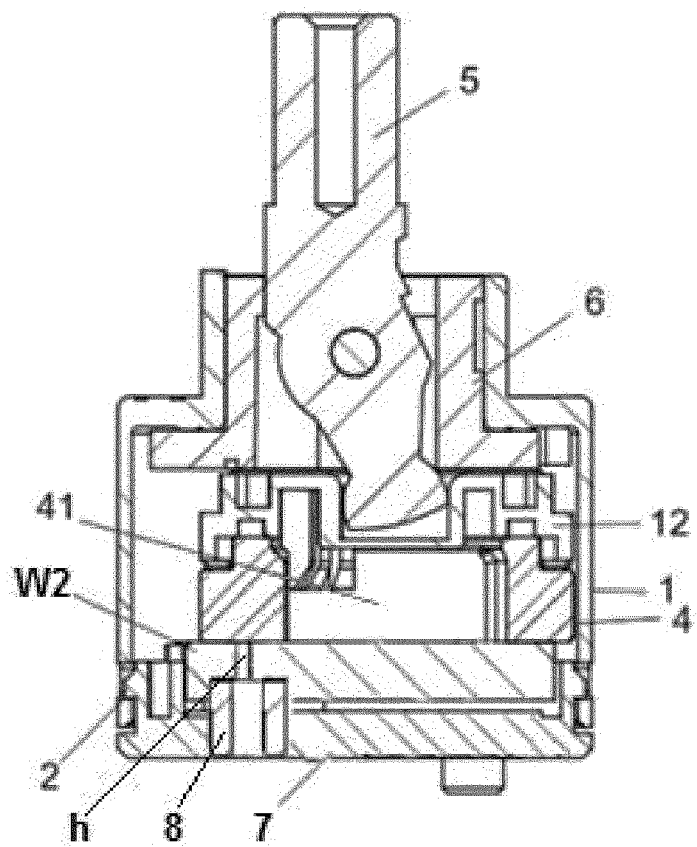
FIG. 1a shows a vertical section of the mixing cartridge of the present invention for an embodiment for which the flow rate limiting arrangement comprises a wall in the fixed plate of the cartridge.

FIGS. 1a, 1b, 2 and 5 show the mixing cartridge of the present invention, for embodiments for which the cartridge comprises a cartridge body 1 and a top element 6 rotatably coupled to the cartridge body 1, the top element 6 comprising a fulcrum 9 and an actuation lever 5 pivotable about said fulcrum 9 between a forward and a backward position.

As shown in the cited figures, the mixing cartridge further comprises a fixed plate 2 and a movable element 10, both provided within the cartridge body 1. The fixed plate 2 comprising input openings 21, 22 for the separate inflow of hot and cold water and an output opening 23 for the outflow of mixed water.

The movable element 10 comprises a movable plate 4 internally defining a mixing chamber 41 and a plate cover 12 affixed to the movable plate 4, such that it closes the upper part of a through opening defining the mixing chamber 41 in the movable plate 4.

The plate cover 12 is rotatably coupled to an end of the actuation lever 5, such that the whole movable element 10, including movable plate 4 is moved on or with respect to the fixed plate 2 by acting on the actuation lever 5. The mixing chamber 41 is open towards the fixed plate 2 and selectively communicates or blocks the communication of the input openings 21, 22, in part or completely, with said output opening 23, depending on the position adopted by the movable plate 4.

By pivoting the actuation lever 5 about the fulcrum 9 the movable element 10 is linearly displaced on the fixed plate 2 increasing progressively the flow-rate of mixed water. Additionally, rotating the top element 6 about its longitudinal axis (acting on the actuation lever 5) causes a rotation of the movable element 10 on the fixed plate 2 varying progressively the mixture of hot and cold water, and hence the temperature of the mixed water, for a given outflow rate.

The mixing cartridge further comprises a base element 7 associated with the cartridge body 1 and lying underneath the fixed plate 2, the base element 7 comprising water flow through openings communicated with the input and output openings 21, 22, 23 of the fixed plate 2, through respective sleeves 8.

FIG. 3 shows the movable plate 4 of the mixing cartridge of the present invention, for an embodiment for which the movable plate 4 includes a wall W1 having two separate holes distribution patterns, each having a plurality of through holes h, for limiting the two respective water inflows. Said wall W1 is comprised by the flow rate limiting arrangement of the cartridge of the present invention.

Figure 1B:
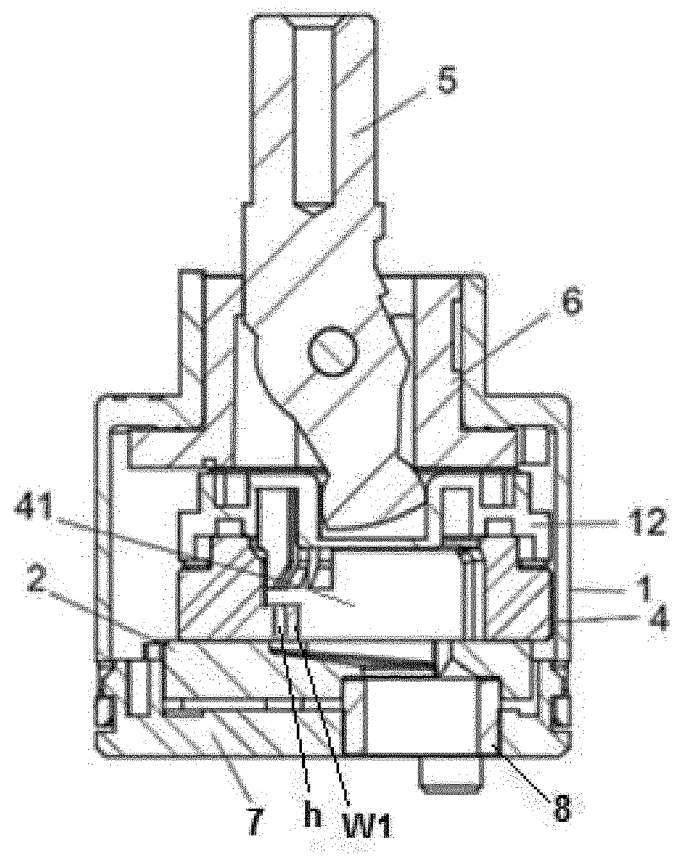
FIG. 1b shows a vertical section of the mixing cartridge of the present invention for another embodiment in which the flow rate limiting arrangement comprises a wall placed in the movable plate of the cartridge.

The embodiment depicted by FIG. 1b includes the movable plate 4 of FIG. 3, showing, by means of a cross-section, one the holes h in the wall W1.

On the other hand, FIG. 4 shows a fixed plate 2 of the mixing cartridge of the present invention, for an embodiment for which the fixed plate 2 has a wall W2 having two separate holes distribution patterns, each having a plurality of through holes h for limiting the two respective water inflows.

For the embodiment depicted by FIG. 4, the through holes h traverse the whole thickness of the wall W2, i.e. the holes h substitute input openings 21, 22 (see FIG. 2).

The embodiment depicted by FIG. 1a includes the fixed plate 2 of FIG. 4, showing, by means of a cross-section, one of the holes h in the wall W2.

For an alternative embodiment (not shown), the wall W2 is an independent part attached to a major face of the fixed plate 2, such that the holes h are arranged over the input openings 21, 22 communicated there with.

Figure 5:
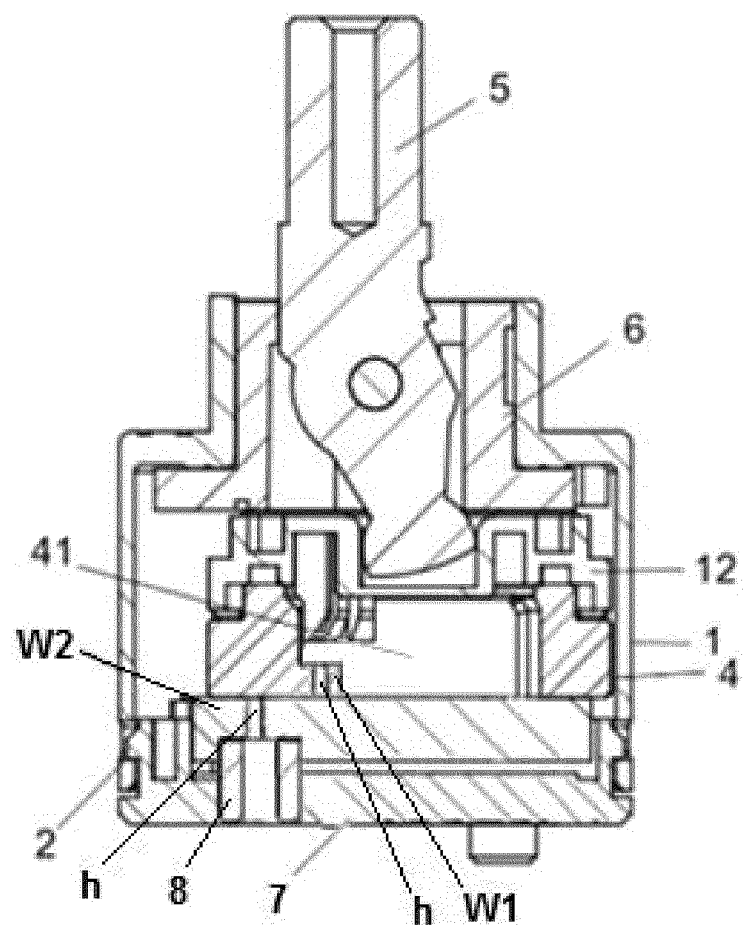
FIG. 5 shows a vertical section of the mixing cartridge of the present invention for an embodiment for which the flow rate limiting arrangement comprises a wall in the fixed plate of the cartridge and also a wall placed within the mixing chamber of the movable plate.

FIG. 5 shows an embodiment which is a combination of the embodiments of FIGS. 1a and 1b, i.e. an embodiment for which the flow rate limiting arrangement of the present invention comprises two walls, one W1 in the movable plate 4 and another W2 in the fixed plate 2, each having a plurality of through holes h.

Regarding the shapes of the holes h, the holes distribution patterns, the number of holes h per holes distribution pattern and the number, shape (flat or uneven) and locations of the walls W1, W2, they can be different to the ones depicted in the Figures, for other non-illustrated embodiments.

Figure 6A:
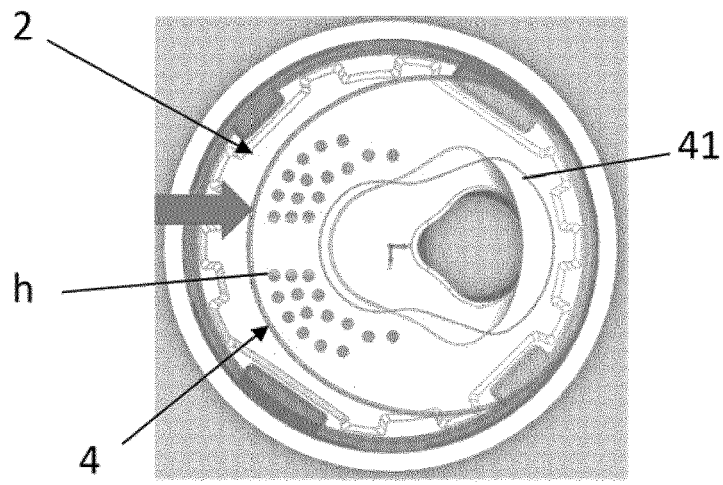
FIGS. 6a, 6b and 6c schematically show, by means of three respective plan views, the fixed and movable plates of the mixing cartridge of the present invention, for an embodiment, for three different rotation positions of the movable plate.
Figure 6B:
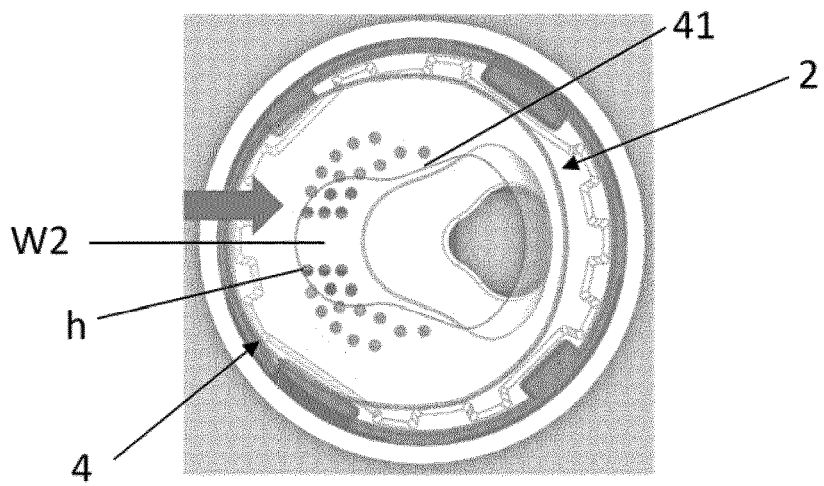
Figure 6C:
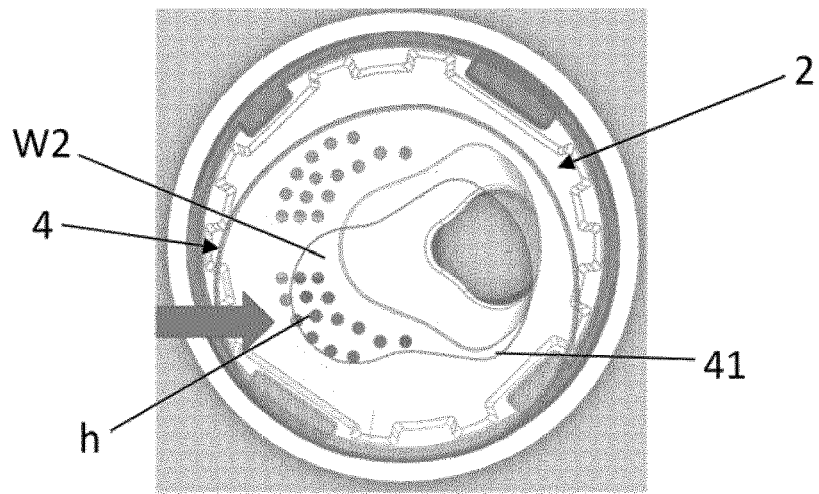

FIGS. 6a, 6b and 6c schematically show, by means of three respective plan views, the fixed 2 and movable 4 plates of the mixing cartridge of the present invention, for an embodiment, for three different rotation positions of the movable plate.

As shown in FIGS. 6b and 6c, the separate regions of the wall W2 (i.e. that of the fixed plate 2) circumscribing the holes h of the holes distribution patterns interposed in the inflows of hot and cold water are separated from one another a predetermined distance which, together with the holes distribution in said holes distribution patterns, provides a substantially constant flow rate for the water entering into the mixing chamber 41 for all the possible rotating positions of the movable plate 4 about a longitudinal axis of the cartridge body 1 while the movable plate 4 is maintained at the same linear position on the fixed plate 2.

Each of said FIGS. 6b and 6c shows one of said possible rotating positions of the movable plate 4 for a maximum forward linear position about the fulcrum 9. Particularly, at FIG. 6b ten holes h are communicated with the mixing chamber 41, five for the hot water inflow and five for the cold water inflow, while for the rotating position of FIG. 6c about twelve holes are communicated with the mixing chamber 41, all of them for the same inflow (hot or cold water). Therefore, what has been denominated above as a substantially constant flow rate means the flow going through a similar amount of holes, not necessarily an identical number, differing in three or four holes as maximum.

FIG. 6a shows the movable plate 4 at the backwards linear position about the fulcrum 9, where none hole h is communicated with the mixing chamber 41.

For the embodiment shown in FIGS. 6a, 6b and 6c (and also for the rest of embodiments), the holes h are distributed in the holes distribution patterns to provide a substantially progressive flow rate increasing/decreasing for the water outflow through the full stroke of the actuation lever 5 when pivoted about the fulcrum 9, in contrast to standard mixing cartridges with external flow rate limiters, for which the maximum flow rate is reached at half the stroke of the actuation lever 5.

Figure 7:
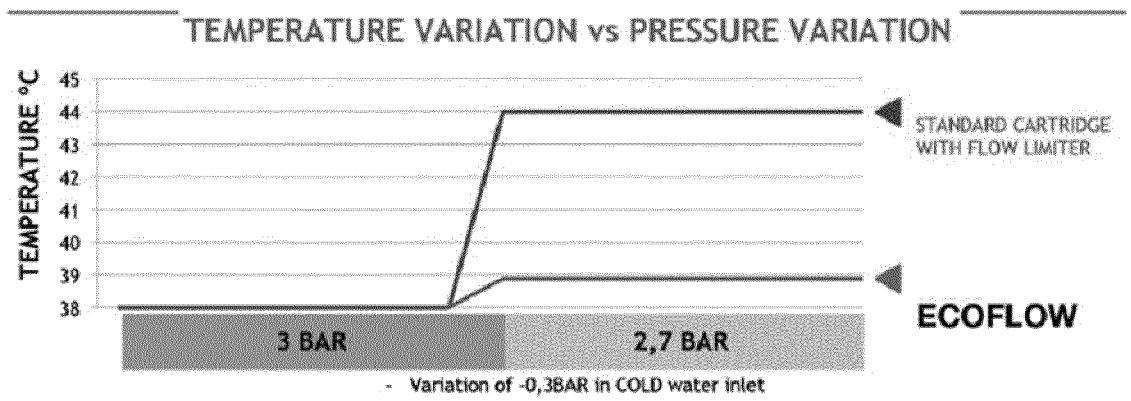
FIG. 7 is a diagram which graphically shows how a variation in the pressure of the water inflow makes the temperature of the water outflow vary, for a standard cartridge and a flow limiter arranged at the faucet spout (standard cartridge with flow limiter) and for a prototype of the mixing cartridge of the present invention (Ecoflow).

Finally, FIG. 7 is a diagram which graphically shows how a variation in the pressure of the water inflow makes the temperature of the water outflow vary, for a standard cartridge and a flow limiter arranged at the faucet spout (standard cartridge with flow limiter) and for a prototype of the mixing cartridge of the present invention (Ecoflow).

Indeed, as shown in FIG. 7, for those solutions consisting in arranging a flow limiter in the spout of the faucet, a variation in the pressure of the water inflow really influences the temperature of the outflow, which varies largely. In contrast, with the mixing cartridge of the present invention the temperature of the outflow is very stable with respect to said variations in the pressure of the water inflow.

A person skilled in the art could introduce changes and modifications in the embodiments described without departing from the scope of the invention as it is defined in the attached claims.

The invention claimed is:
1. A mixing cartridge, comprising:
a cartridge body;
an actuation lever
a fixed plate provided at least in part within the cartridge body, the fixed plate comprising input openings for the separate inflow of hot and cold water and an output opening for the outflow of mixed water; and
a movable element comprising a movable plate provided within the cartridge body and coupled to the actuation lever to be moved on or with respect to the fixed plate by acting on the actuation lever, said movable plate internally defining a mixing chamber open towards said fixed plate and which selectively communicates or blocks the communication of said input openings, in part or completely, with said output opening;

wherein:
the mixing cartridge comprises a flow rate limiting arrangement placed within the cartridge body in the path followed by the water flow between said inflows and said outflow, so that the flow rate of said water is limited;
said flow rate limiting arrangement comprises a permeable barrier having a permeability distribution selected and predetermined to affect at least portions of said water flow so that a required limited water flow rate is provided thereto;
said permeable barrier comprises a wall having a plurality of through holes providing said permeability to the barrier, and distributed according to at least one holes distribution pattern defined in a region of the wall and interposed in at least one of said inflows of hot and cold water, so that the flow rate thereof is limited when passing through said holes;
said wall is placed outside the mixing chamber and is integral with the fixed plate, so that the wall and the fixed plate form a single-piece part; and
said plurality of through holes traverse the whole thickness of the wall up to a sealing contact area between the fixed plate and the movable plate, so that at least one of said input openings is constituted by said through holes.

2. The mixing cartridge of claim 1, wherein said plurality of through holes are distributed according to at least two separate holes distribution patterns defined in two corresponding separate regions of the wall, each of said holes distribution patterns interposed in one of said inflows of hot and cold water so that the flow rate thereof is limited when passing through the holes of the respective holes distribution pattern.

3. The mixing cartridge of claim 2, wherein said plurality of through holes are distributed according to at least three separate holes distribution patterns defined in three corresponding separate regions of the wall, each of said holes distribution patterns interposed in one of said hot water inflow, said cold water inflow and said mixed water outflow, so that the flow rate thereof is limited when passing through the holes of the respective holes distribution pattern.

4. The mixing cartridge of claim 2, wherein each of said separate regions of the wall circumscribe the holes of a respective of said separate holes distribution patterns and interstitial material remaining between the holes which block the pass of water flow there through, wherein for each of said separate regions the area occupied by the holes is lower than the area occupied by the interstitial material.

5. The mixing cartridge of claim 4, wherein for each of the separate regions the area occupied by the holes is between 10% and 40% of the total area of the separate region.

6. The mixing cartridge of claim 5, wherein for each of the separate regions the area occupied by the holes is between 20% and 30% of the total area of the separate region.

7. The mixing cartridge of claim 4, wherein said separate regions of the wall circumscribing the holes of the holes distribution patterns interposed in the inflows of hot and cold water are separated from one another a predetermined distance which, together with the holes distribution in said holes distribution patterns, provides a substantially constant flow rate for the water entering into the mixing chamber for all the possible rotating positions of the movable plate about a longitudinal axis of the cartridge body while the movable plate is maintained at the same linear position on the fixed plate.

8. The mixing cartridge of claim 4, wherein the holes are distributed in said holes distribution patterns to provide a substantially progressive flow rate increasing/decreasing for the water outflow through the full stroke of the actuation lever when pivoted about a fulcrum orthogonal to a longitudinal axis of the cartridge body.

9. The mixing cartridge of claim 1, wherein said through holes traverse the wall substantially orthogonally with respect to a plane occupied by a face of the wall, so that the path followed by the water flow when traversing the holes is also substantially orthogonal to said face of the wall.

10. The mixing cartridge of claim 2, wherein said wall is dimensioned and arranged to be interposed between the water inflows and the mixing chamber, so that the communication between the output opening for the outflow of mixed water and the mixing chamber is not blocked by the wall in any position of the movable plate.

11. The mixing cartridge of claim 1, wherein part of said flow rate limiting arrangement is placed within the mixing chamber, and further wherein said wall is a second wall, and said part of the flow rate limiting arrangement which is placed within the mixing chamber is said first wall, which is attached to or integral with the movable plate and also having a plurality of through holes which follow one or more holes distribution patterns, wherein the through holes of the second wall communicate with the through holes of the first wall for some of positions adopted by the movable plate.

12. The mixing cartridge of claim 1, wherein said input openings for the separate inflow of hot and cold water comprised by the fixed plate are constituted by the through holes of two of said respective holes distribution patterns.

13. The mixing cartridge of claim 1, wherein said through holes have a maximum transversal dimension of between 0.5 mm and 3 mm.

14. The mixing cartridge of claim 13, wherein said through holes have a maximum transversal dimension of 1 mm.

* * * * *